H. A. SUGG.
GIN COTTON SEED CLEANER.
APPLICATION FILED NOV. 13, 1908.
932,350.
Patented Aug. 24, 1909.
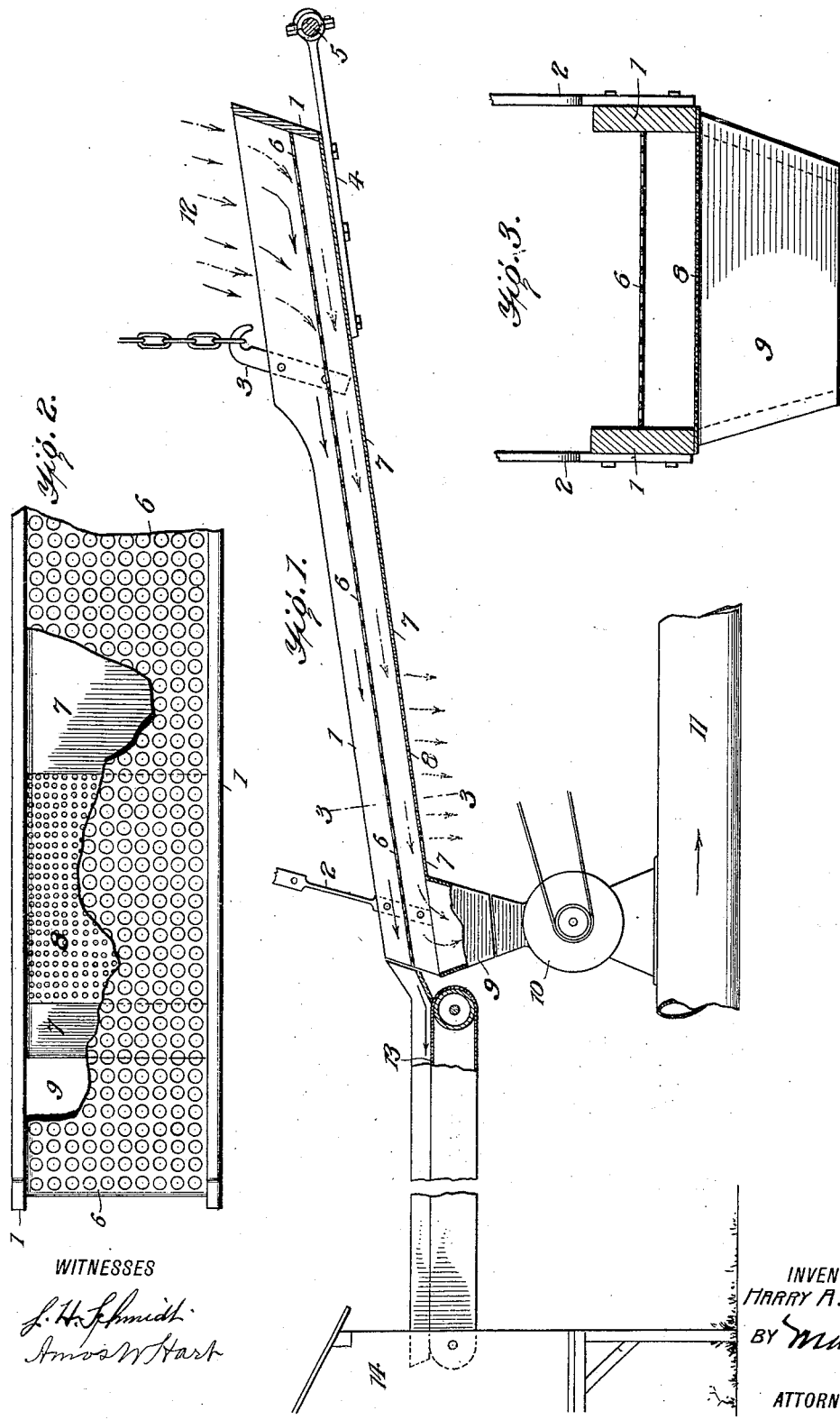
WITNESSES
INVENTOR
HARRY A. SUGG,
BY Munn&Co.
ATTORNEYS

UNITED STATES PATENT OFFICE.

HARRY ANDERSON SUGG, OF KENNETT, MISSOURI.

GIN COTTON-SEED CLEANER.

932,350. Specification of Letters Patent. Patented Aug. 24, 1909.

Application filed November 13, 1908. Serial No. 462,394.

*To all whom it may concern:*

Be it known that I, HARRY ANDERSON SUGG, a citizen of the United States, residing at Kennett, Dunklin county, State of Missouri, have invented an Improvement in Gin Cotton-Seed Cleaners, of which the following is a specification.

My invention is a shaking screen for cleaning gin cotton-seed by removing therefrom hulls, loose cotton, dirt, and sand. It is adapted and used for receiving cotton-seed discharged from the gins, and separates from the seed the cotton and hulls, which are conveyed to a storage bin, the cotton being subsequently returned to the gin to be re-ginned, whereby an important saving is effected.

The details of construction, arrangement, and operation of parts are as hereinafter described, and illustrated in the accompanying drawing in which—

Figure 1 is a longitudinal section of my improved screen. Fig. 2 is a plan view, a portion of the upper screen being removed to show the underlying parts. Fig. 3 is a transverse section on the line 3—3 Fig. 1.

The body 1 of my improved screen is trough-like in form and is suspended by flexible wood hangers 2, and hooks and chains 3, while it is connected by arms 4 with an eccentric shaft 5, by which it is shaken in a well understood manner. A screen 6, having perforations of sufficient size to permit of the passage of cotton-seed, is arranged lengthwise in the body 1 and extends from end to end of the same. Underlying, and separated from, this screen, is a smooth sheet metal bottom 7 which extends from the upper end of the body for about two-thirds the length of the body, a sand-screen 8 being then arranged to form a practical continuation of the bottom. The lower end of the bottom 7 terminates at a hopper 9, which is pendent from the body of the screen and serves to receive the cleaned cotton-seed, which it discharges into a blower, or Sturtevant fan, 10, from which in turn it is delivered to a seed-pipe 11 and conveyed to a storage bin, not shown. The receiving end of this swinging shaker, is, in practice, arranged immediately under the discharge end of a seed-conveyer which delivers the seed from the gins. The seed thus discharged by the conveyer onto the screen 6, passes through the latter and falls upon the smooth bottom 7 and slides down the same over the perforated screen 8 through which the sand is sifted on to the ground below, the cleaned seed passing on and falling into the hopper 9, from which it is delivered to the pipe 11, as before stated. The mixture of cotton and hulls separated from the seed on the screen 6 passes down the same and is delivered upon a conveyer 13 by which it is delivered to a storage bin 14, that is in practice located some twenty feet from the shaker. The cotton thus deposited in the bin is ultimately returned to the gins to be re-ginned.

It will be seen that the shaker is very simply and economically constructed and is entirely effective for separating cotton, hulls, and sand from the seed and for saving the cotton which comes from the gin hullers with the seed. In brief, it saves the seed-cotton which careless ginners allow to go with the seed, and also saves to the ginner a dockage which oil-mill operators make on all seeds containing dirt, hulls, cotton, and sand.

What I claim is:

In a cotton-seed cleaner, the combination with a conveyer for cotton and hulls separated from the seed, and a seed-receiving fan and seed-conducting pipe, of a shaker screen having suitable suspending devices and means for reciprocating it, the same being constructed with a trough-like body provided with a perforated screen extending from end to end and arranged to deliver upon the conveyer, and a smooth, sheet metal bottom and a sand-screen arranged in the lower portion of the same, both the bottom and sand-screen being separated from the perforated screen and arranged parallel thereto, and a hopper pendent from the lower end of the body of the shaker and flush with the bottom of the latter, whereby it is adapted to receive the cleaned seed, as shown and described.

HARRY ANDERSON SUGG.

Witnesses:
WILL A. JONES,
W. A. SHELTON, Jr.